United States Patent
Suneya

(10) Patent No.: US 8,358,688 B2
(45) Date of Patent: Jan. 22, 2013

(54) METHOD FOR TRANSMITTING MOVING IMAGE DATA AND COMMUNICATION APPARATUS

(75) Inventor: Toru Suneya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1102 days.

(21) Appl. No.: 12/245,991

(22) Filed: Oct. 6, 2008

(65) Prior Publication Data

US 2009/0110055 A1    Apr. 30, 2009

(30) Foreign Application Priority Data

Oct. 29, 2007    (JP) ................................. 2007-280442

(51) Int. Cl.
*H04N 7/12* (2006.01)
(52) U.S. Cl. ......... 375/240.01; 375/240.02; 375/240.12; 375/240.26; 375/240.27
(58) Field of Classification Search .............. 375/240.01
See application file for complete search history.

(56) References Cited

U.S. PATENT DOCUMENTS

| | | | | |
|---|---|---|---|---|
| 4,833,535 A | * | 5/1989 | Ozeki et al. ................. | 348/400.1 |
| 5,781,593 A | * | 7/1998 | Petch et al. .................. | 375/354 |
| 5,966,166 A | * | 10/1999 | Coutinho et al. ............. | 348/14.1 |
| 6,549,724 B2 | * | 4/2003 | Nishi et al. ..................... | 386/329 |
| 6,553,073 B1 | * | 4/2003 | Ogata ...................... | 375/240.28 |
| 6,711,179 B1 | * | 3/2004 | Hanaoka et al. .............. | 370/474 |
| 6,882,634 B2 | * | 4/2005 | Bagchi et al. ................. | 370/338 |
| 6,950,467 B2 | * | 9/2005 | Yoo .......................... | 375/240.12 |
| 2010/0232514 A1 | * | 9/2010 | Nomizo ................... | 375/240.24 |

FOREIGN PATENT DOCUMENTS

| | | |
|---|---|---|
| JP | 11-331839 A | 11/1999 |
| JP | 2002-112265 A | 4/2002 |
| JP | 2004-304843 A | 10/2004 |
| JP | 2007-281716 A | 10/2007 |
| WO | 2005125215 A1 | 12/2005 |

* cited by examiner

*Primary Examiner* — David Y Jung
(74) *Attorney, Agent, or Firm* — Canon USA, Inc., IP Division

(57) ABSTRACT

A method for transmitting moving image data that includes a plurality of frames each divided into a plurality of pieces of data includes setting a priority to each of the plurality of pieces of data based on a characteristic thereof, determining a transmission order of the plurality of pieces of data to transmit the plurality of pieces of data according to the set priority, wherein a transmission order of the plurality of pieces of data having a same priority is determined not to transmit data which is displayed at a same position in successive frames in a same transmission order, and transmitting the plurality of pieces of data in the determined transmission order.

15 Claims, 9 Drawing Sheets

FIG.5
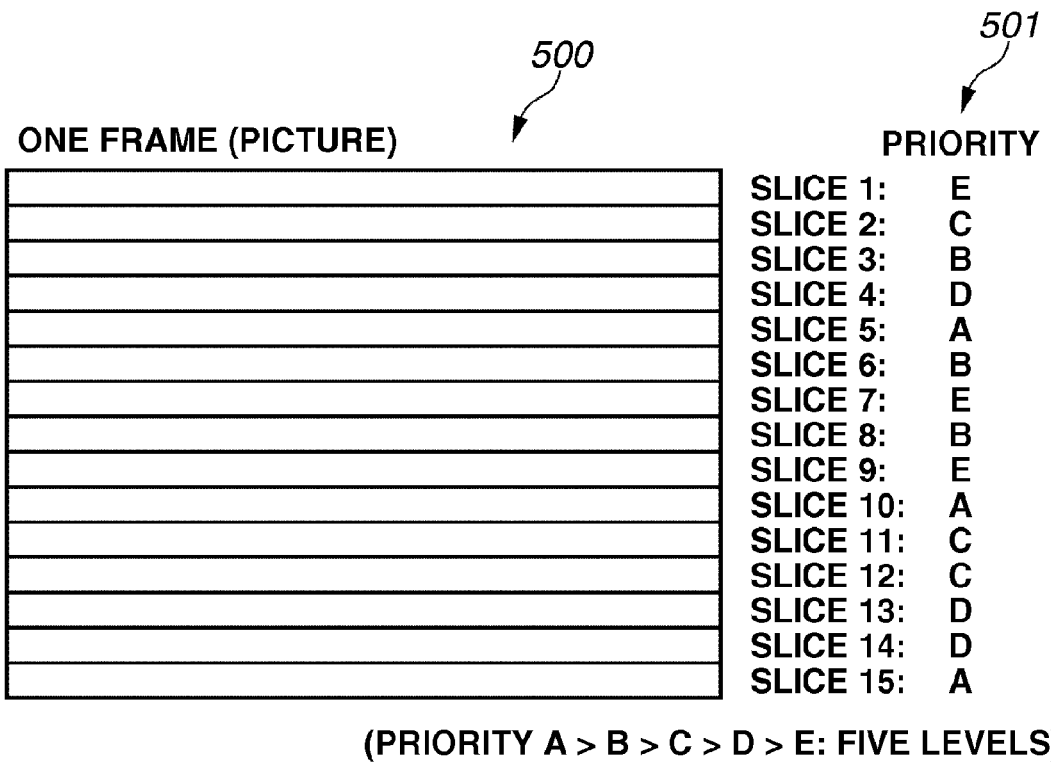
(PRIORITY A > B > C > D > E: FIVE LEVELS)
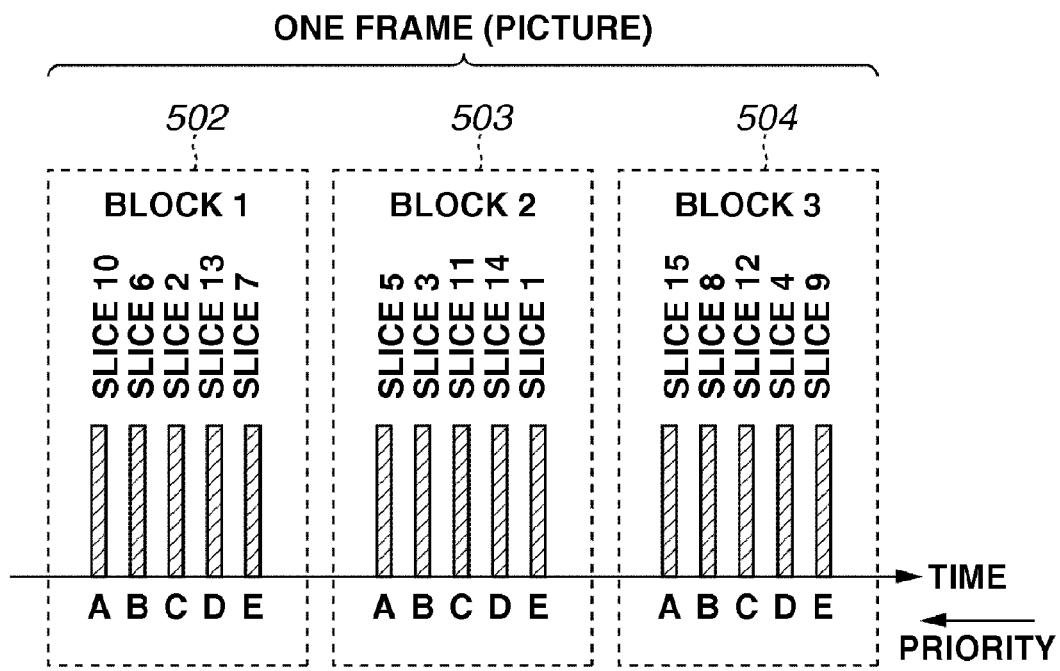

FIG.6
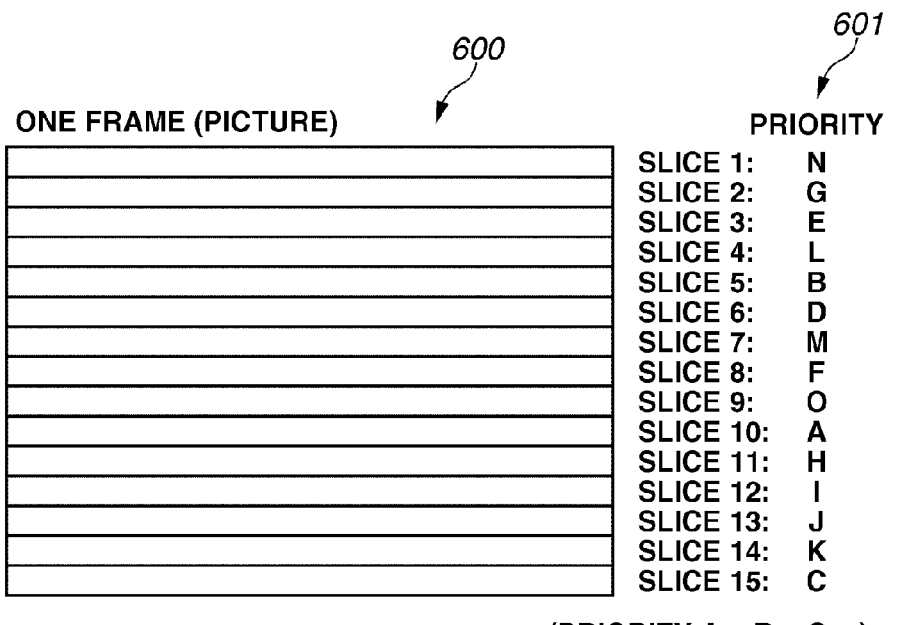
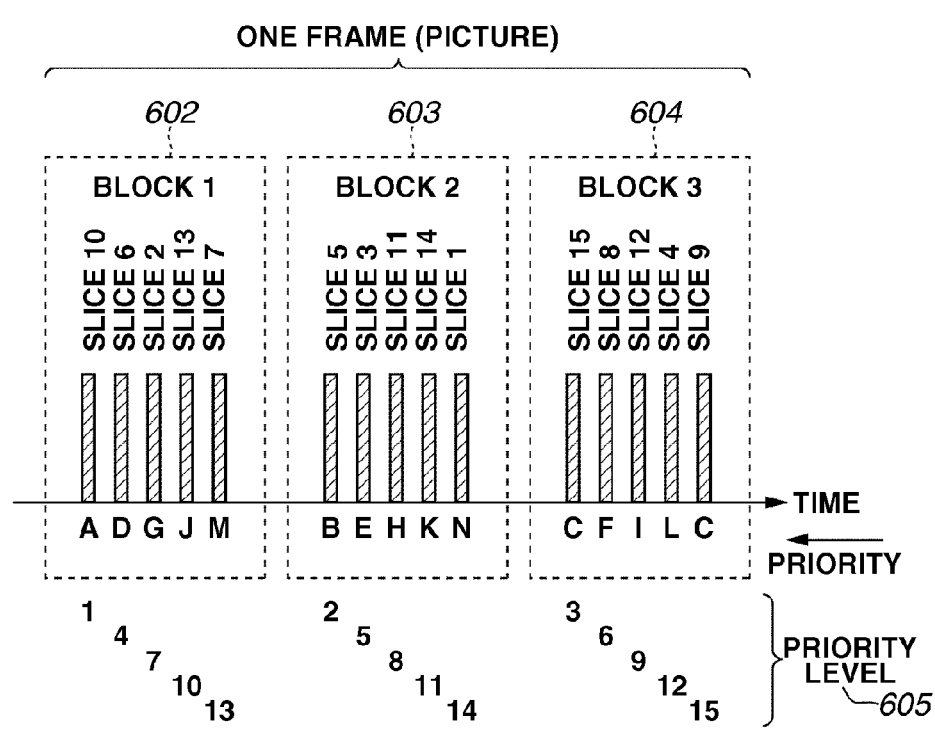

METHOD FOR TRANSMITTING MOVING IMAGE DATA AND COMMUNICATION APPARATUS

BACKGROUND OF THE INVENTION

1. Field of the Invention

The present invention relates to a technique for dividing and transmitting moving image data via a wired or wireless network.

2. Description of the Related Art

In recent years, network users commonly view moving images via a communication line such as the Internet along with development in a communication system.

In general, a communication protocol called "real-time transport protocol (RTP)" is used for transferring moving image data, in particular, the moving image data that requires real-time communication, such as a live image. The RTP is a protocol for transferring sounds, moving images, or other data in real time. The RTP protocol is defined as request for comments (RFC) 1889 and RFC 1890 by the Internet Engineering Task Force (IETF).

The RTP protocol does not always ensure high data reliability but a low layer protocol such as a user datagram protocol/internet protocol (UDP/IP) which can achieve a relatively-high communication speed is used. In a case of using the UDP/IP or other such protocols, these protocols excel in the real-time communication and efficiency when using a communication band but tend to cause an error such as a packet by its nature.

As a solution to this problem, a technique for suppressing occurrences of the error has been discussed. For example, a data loss appears due to a buffer overflow in a router on a network path and a technique for reducing the data loss by averaging packet transmission intervals has been discussed. In addition, a highly-reliable communication line has been proposed from a viewpoint of communication.

However, even if these techniques are applied, when network congestion or the like actually occurs, it is difficult to reduce a rate of occurrence of the packet loss to zero. Japanese Patent Application Laid-Open No. 11-331839 discusses a technique for determining a level of importance of moving image data on a frame basis using intraframe positional information, and transmitting the data in a descending order of the importance to reduce a packet loss in a highly-important portion.

However, the above conventional technique that determines the importance level of the data in each frame is not necessarily appropriate depending on methods for encoding moving image data or methods for controlling transmission timing of packets.

To be specific, data transmission on a network tends to lose a packet at particular transmission timing or in a particular transmission position depending on a processing sequence for packet transmission timing control. Therefore, in transmission of moving image data, when importance level of the data is determined based on intraframe positional information and the data is transmitted in a descending order of the importance level, two or more pieces of data in a same position in one frame cannot be correctly and continuously reproduced. As a result, an error portion is observable.

SUMMARY OF THE INVENTION

The present invention is directed to a method for transmitting moving image data which takes an influence of a transmission error such as a packet loss on a reproduced image into account.

According to an aspect of the present invention, a method for transmitting moving image data that includes a plurality of frames each divided into a plurality of pieces of data, includes setting a priority to each of the plurality of pieces of data based on a characteristic thereof, determining a transmission order of the plurality of pieces of data to transmit the plurality of pieces of data according to the set priority, wherein a transmission order of a plurality of pieces of data having same priority is determined not to transmit data which is displayed at a same position in successive frames in a same transmission order, and transmitting the plurality of pieces of data in the determined transmission order.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates combinations of a priority and transmission timing control.

FIG. 6 illustrates combinations of a priority and transmission timing control.

DETAILED DESCRIPTION OF THE EMBODIMENTS

Various exemplary embodiments, features, and aspects of the invention will be described in detail below with reference to the drawings.

Figure 1:
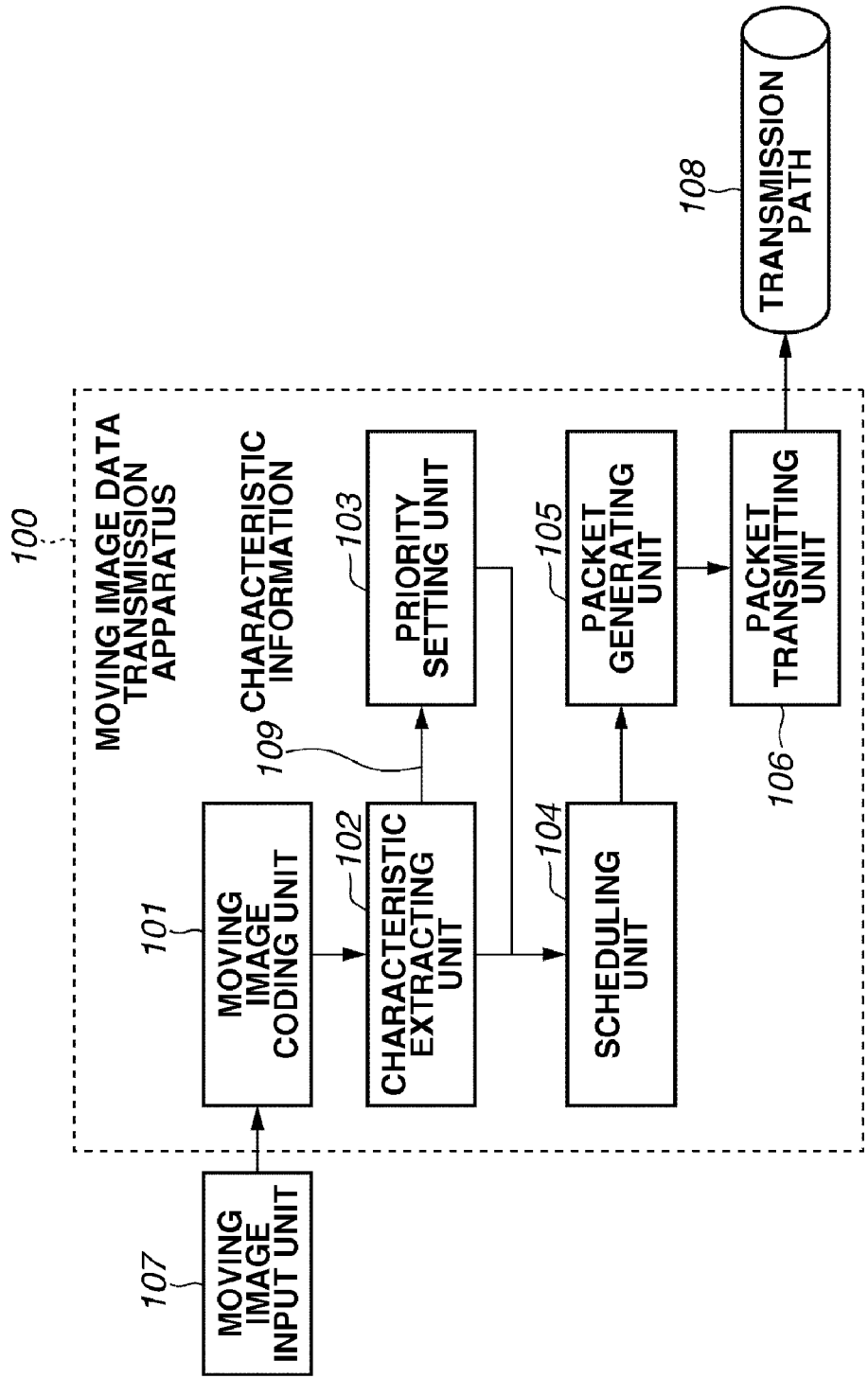
FIG. 1 is a block diagram illustrating an example configuration of a moving image data transmission apparatus according to an exemplary embodiment of the present invention.

A first exemplary embodiment is described below. FIG. 1 is a block diagram illustrating a configuration of a moving image data transmission apparatus according to the first exemplary embodiment of the present invention.

As illustrated in FIG. 1, a moving image data transmission apparatus 100 includes a moving image coding unit 101, a characteristic extracting unit 102, a priority setting unit 103, a scheduling unit 104, a packet generating unit 105, and a packet transmitting unit 106. The moving image data transmission apparatus 100 is a communication apparatus for transmitting moving image data which includes frames each divided into a plurality of pieces of data.

The moving image coding unit 101 encodes moving image data input from a moving image input unit 107 such as a video camera or a network camera based on, for example, a moving picture experts group phase 4 (MPEG-4) system, to reduce a data amount. The moving image data encoding system may also be an MPEG-2 or H.264, other than MPEG-4.

The characteristic extracting unit 102 extracts characteristics of the moving image data that is encoded by the moving image coding unit 101, per unit of division. In the present exemplary embodiment, the unit of division is a slice. The extracted characteristics include a size and configuration information about encoded data of each unit of division (slice)

The configuration information about encoded data includes, for example, a number of macroblocks that are obtained based on a particular macroblock encoding type. In the present exemplary embodiment, the macroblock is a unit of data including 16×16 pixel data.

The macroblock encoding type includes, for example, an intra macroblock and an intermacroblock. The characteristic extracting unit 102 that extracts characteristics per unit of division generates characteristic information 109 representing the characteristics and sends the generated characteristic information 109 to the priority setting unit 103.

The priority setting unit 103 sets a priority to the respective plurality of pieces of data based on the characteristics of the data. How to set the priority is described below.

The scheduling unit 104 includes a buffer capable of storing data corresponding to at least one frame, and determines a transmission order of each unit of division based on the priority set by the priority setting unit 103 to generate transmission order information.

The packet generating unit 105 packetizes the encoded moving image data based on the characteristic information 109 and the transmission order information. The packet transmitting unit 106 transmits the data packetized by the packet generating unit 105 to a transmission path 108 according to the transmission order information. The transmission path 108 is typified by various wired and wireless networks.

Next, how to set the priority of each unit of division with the priority setting unit 103 and how to determine the transmission order with the scheduling unit 104 are described.

In the present exemplary embodiment, the moving image data is divided into slices, and priorities and transmission orders of the slices are determined.

Figure 2:
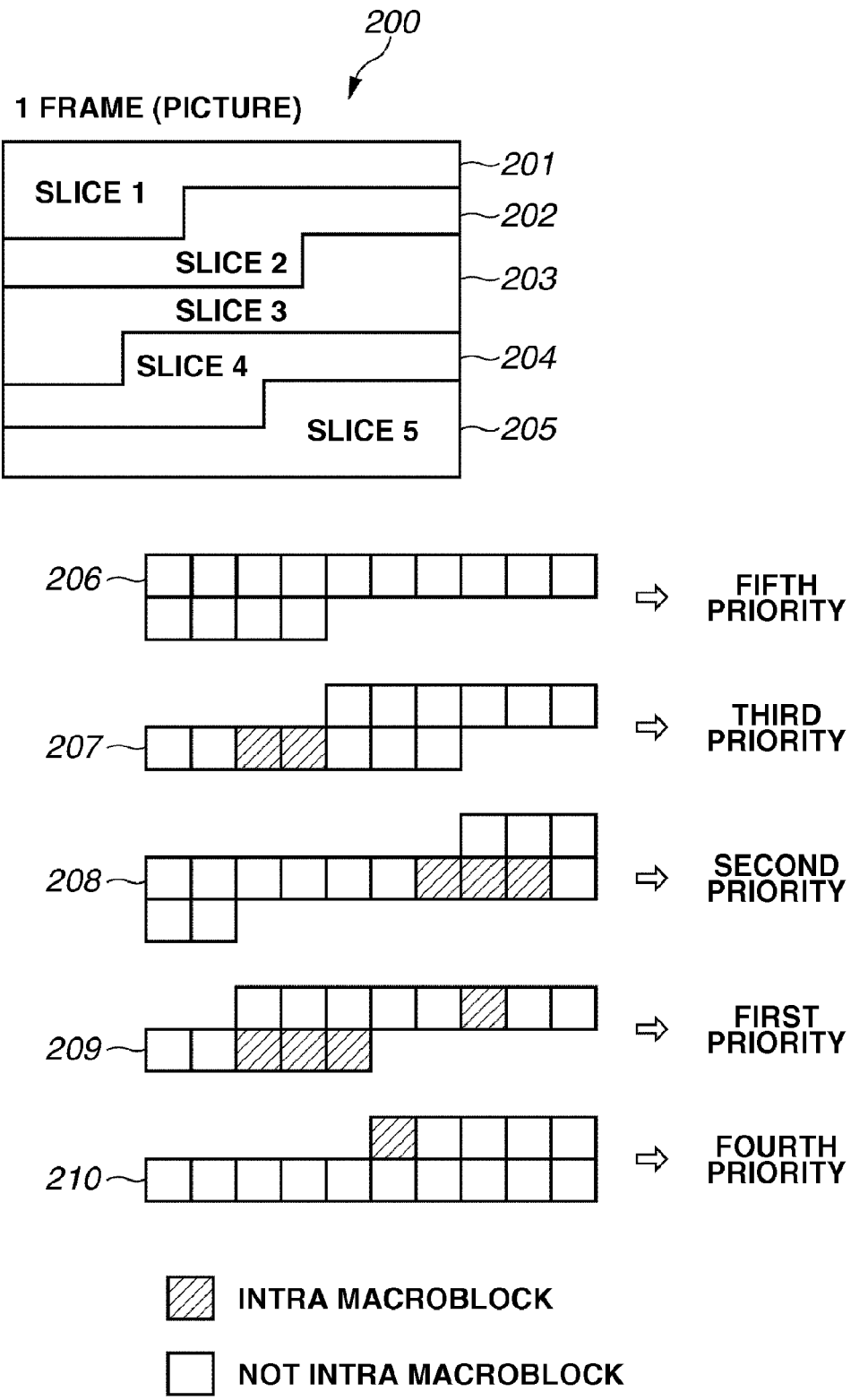
FIG. 2 illustrates an example of how to set a priority.

In FIG. 2, one frame (picture) 200 constituting moving image data includes five slices of a slice 1 (201) to a slice 5 (205). In this case, if each slice has a size storable in one packet, information about a division size generated by the characteristic extracting unit 102 is equal to the slice size.

On the other hand, if the slice has a size not storable in one packet, the characteristic extracting unit 102 generates the characteristic information 109 representing that the slice is divided into a plurality of packets.

First, how to set the priority and how to determine the transmission order when each slice has a size storable in one packet are described with reference to FIG. 2.

In FIG. 2, the five slices from the slice 1 (201) to the slice 5 (205) each have a macroblock configuration of 206 to 210 respectively. In FIG. 2, a shaded macroblock denotes an intra macroblock. In this case, a number of intra macroblocks in each slice is as follows: slice 1: 0 intra macroblocks, slice 2: 2 intra macroblocks, slice 3: 3 intra macroblocks, slice 4: 4 intra macroblocks, and slice 5: 1 intra macroblock. In actual moving image data, a plurality of slices including no intra macroblock is often included in one picture.

In the present exemplary embodiment, the priority setting unit 103 gives a higher priority to the unit of division (slice) which includes a larger number of intra macroblocks.

Accordingly, as illustrated in FIG. 2, the slices are prioritized from the slice 4, slice 3, slice 2, slice 5, and slice 1 in a descending order of priority.

Here, the intra macroblock refers to a macroblock subjected to intraframe coding. In other words, the priority setting unit 103 sets the priority based on whether each macroblock constituting the divided moving image data is encoded by data in another frame.

The reason to give the higher priority to the slice which includes the larger number of intra macroblocks is as follows. The intra macroblock is set in a case where a new object that is not included in an image referenced in predictive coding appears in a moving image, for example.

In this case, an encoding amount can be reduced when data is encoded without referring to another frame instead of encoding data with referring to another frame. Thus, when a prediction error exceeds a reference value, an intra macroblock is set.

In addition, when the intra macroblock is used as a reference block for the predictive coding, the predication error is generally small if a lower layer is referenced. Therefore, it is not likely that the intra macroblock is newly set in a reference macroblock sequence in comparison with the other macroblocks.

More specifically, when the intra macroblock does not reach a reception side due to any transmission error, the macroblock referring to the intra macroblock causes an error in decoding processing. Thus, an error is more likely to propagate than in the other macroblocks.

Accordingly, the higher priority is set to the unit of division (slice) including the larger number of intra macroblocks. In the above example, the priority is set based on the number of intra macroblocks but may be set based on a percentage of intra macroblocks in each unit of division (slice).

In this case, the percentage of intra macroblocks in each unit of division (for example, 30% or more, or 10% or less), and the priority corresponding to the percentage may be determined in advance. Accordingly, the priority can be efficiently set to moving image data which has different numbers of macroblocks in each unit of division (for example, video packet).

Further, the intra macroblock has a larger data size than the other macroblocks. Therefore, the higher priority may be given to a slice which includes macroblocks of a large average size.

More specifically, the priority setting unit 103 may set the priority based on a size of divided data. Accordingly, the priority can be set without referring to a type of macroblock, so that the processing can be simplified.

Further, the scheduling unit 104 determines the transmission order to transmit slices in the descending order of priority. However, as for slices having a same priority, the scheduling unit 104 determines the transmission order to transmit the slices in an order different from a rasterization order.

In other words, the scheduling unit 104 determines the transmission order of a plurality of pieces of data which are given a same priority by the priority setting unit 103 so that the plurality of pieces of data displayed at a same position in successive frames are not transmitted in same transmission orders, for a following reason.

Under a circumstance that a packet loss occurs due to network congestion etc., a packet tends to be lost at particular transmission timing or in a particular transmission position depending on a processing sequence for packet transmission timing control.

When moving image data is divided and transmitted, a general moving image data transmission apparatus transmits the data in a predetermined order, for example, a rasterization order in many cases. Therefore, there is a risk of losing data in similar portions in a plurality of successive frames due to a packet loss.

In the present exemplary embodiment, the scheduling unit 104 randomly determines the transmission orders of slices having the same priority to transmit the slices in the order different from the rasterization order, for example. As a result, errors due to the packet loss can be distributed.

Figure 3:
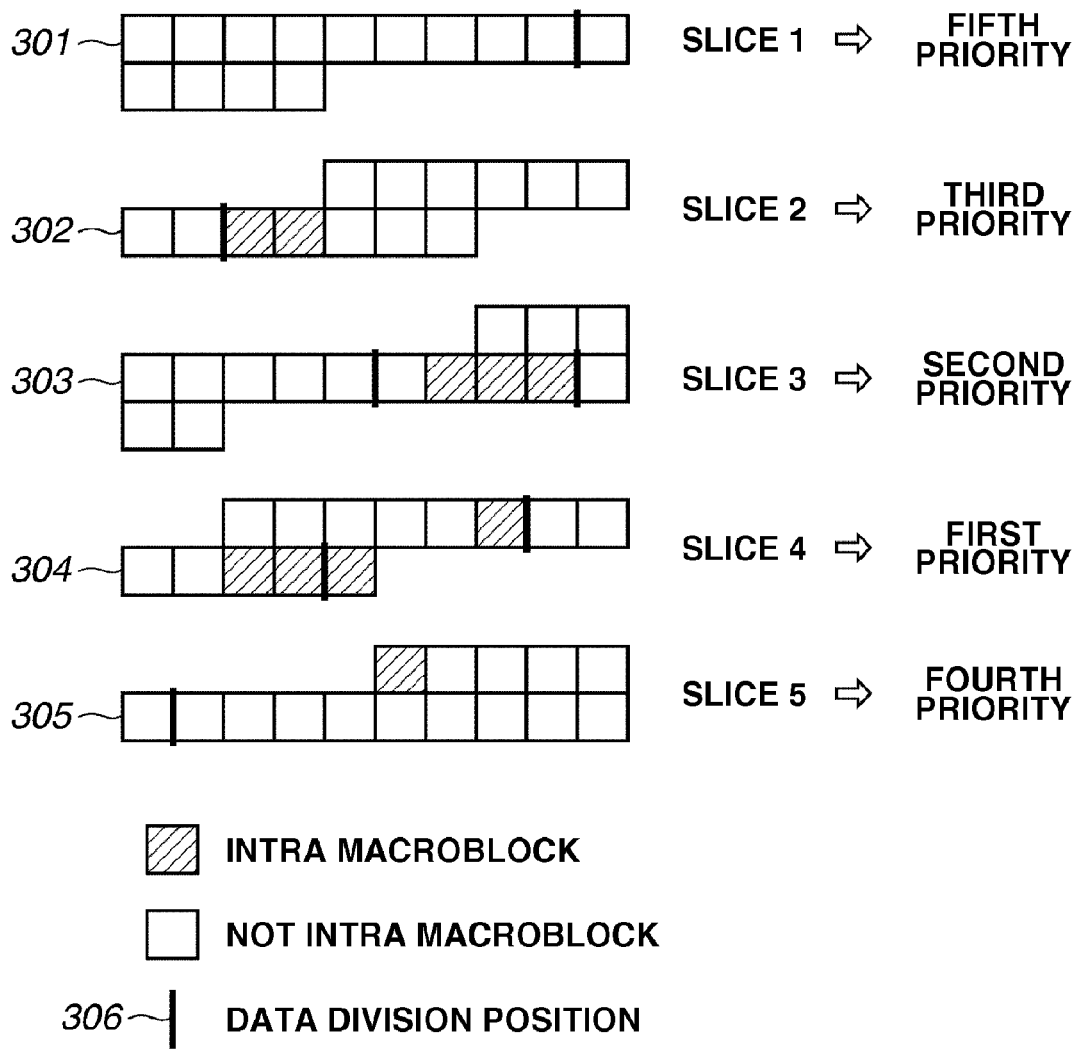
FIG. 3 illustrates an example of how to set a priority in a case of dividing a slice into a plurality of packets.

Next, how to set the priority and how to determine the transmission order when one slice has a size not storable in one packet are described with reference to FIG. 3. In FIG. 3, one frame (picture) includes a slice 1 (301) to a slice 5 (305), and the frame is divided into packets by a data division position 306 and a boundary between slices. In this case, one slice data is divided into a plurality of portions.

As illustrated in FIG. 3, even if each slice is divided into the plurality of portions, the priority is set on a slice basis. Also as for the transmission order, the transmission order is determined so as to continuously and collectively transmit the plurality of portions of one slice data.

This operation prevents a following situation. When the plurality of packets are successively lost, distributed transmission of the one slice data increases a number of slices whose data is partially lost, and thus, the number of slices that would cause an error in decoding increases.

Here, a unit of the above slice is a video packet divided by a resynchronization marker in the MPEG-4 system. More specifically, the priority is set and the transmission order is determined based on a unit (slice or video packet) in which the packet loss that occurs in the unit of division does not affect reproduction of the other unit of division regardless of a packet size.

Here, the resynchronization marker (synchronization information representing a data reproduction position) is not included in the MPEG-4 system for coding in some cases. In this case, the priority setting unit 103 sets a highest priority to a first slice in each frame, namely divided data which includes a visual object plane (VOP) header.

Then, if the synchronization information representing the data reproduction position is not included in portions other than a first position of the frame, the scheduling unit 104 determines the transmission order so as to transmit data corresponding to the first position of the frame in a predetermined order. This operation is performed because, in a case of processing data including no resynchronization marker, the VOP header includes information necessary for decoding the frame.

Figure 8:
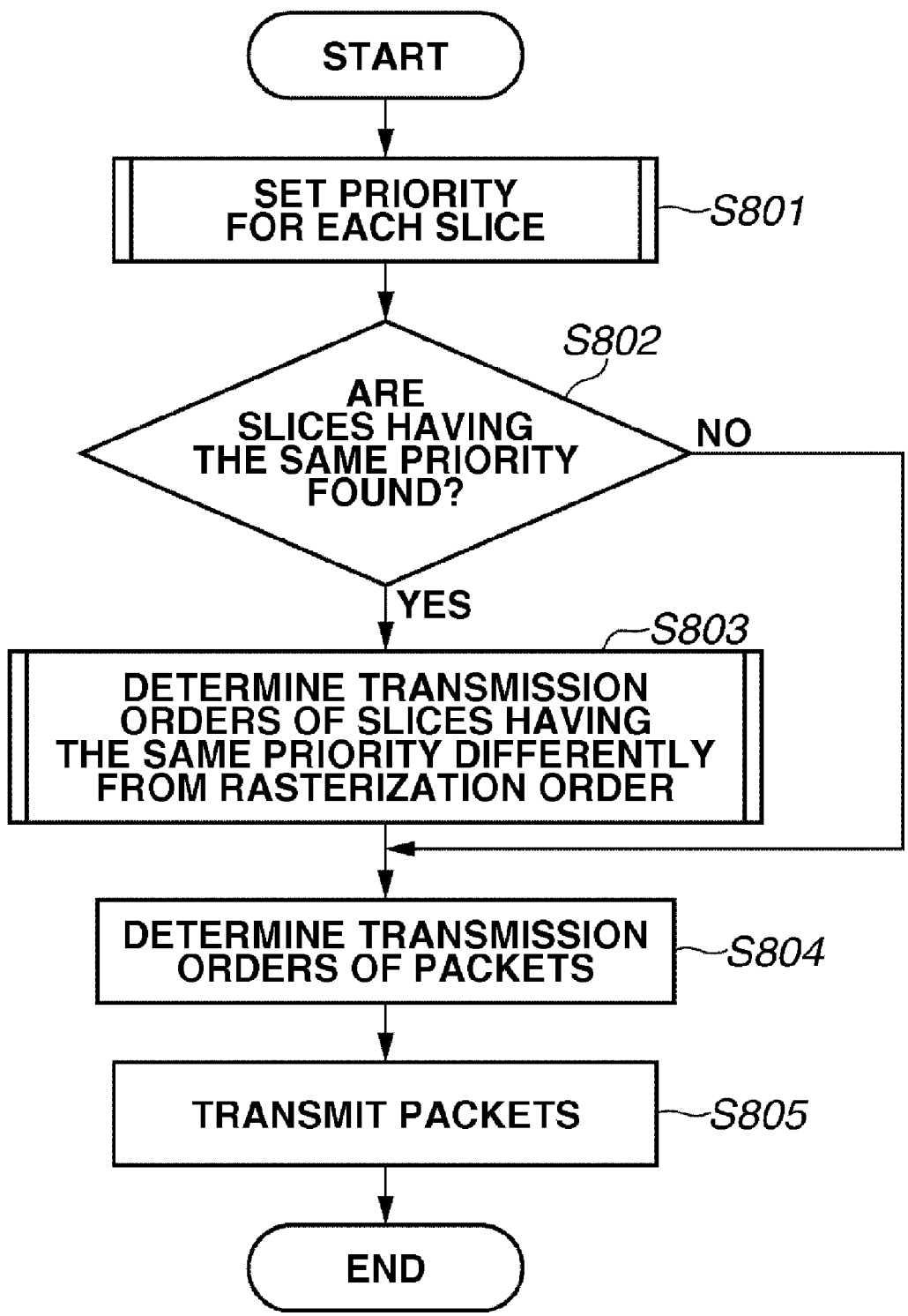
FIG. 8 is a flowchart illustrating packet transmitting processing based on priority setting.

Next, how to set the priority with the priority setting unit 103 and how to determine the transmission order with the scheduling unit 104 according to the present exemplary embodiment are described with reference to a flowchart in FIG. 8.

In step S801 (setting procedure), the priority setting unit 103 sets the priority for each slice based on size information and the configuration of encoded data of each unit of division (slice) which are generated by the above described characteristic extracting unit 102. Then, processing advances to step S802. More specifically, in step S801, the priority setting unit 103 sets the priority to each of a plurality of pieces of data obtained by dividing one frame.

In step S802, the scheduling unit 104 determines whether the priority setting unit 103 gives the same priority to a plurality of slices in the same frame. If the plurality of slices having the same priority are found (YES in step S802), the processing advances to step S803. If the plurality of slices having the same priority are not found (NO in step S802), the processing advances to step S804.

In step S803, the scheduling unit 104 randomly determines the transmission order so as to transmit the slices having the same priority in the order different from the rasterization order, for example. However, in step S803, the transmission order may be determined not randomly but according to any rule.

In step S804 (determination procedure), the scheduling unit 104 determines the transmission orders of all packets based on the priority set in step S801 and the transmission order determined in step S803 and generates transmission order information.

More specifically, the scheduling unit 104 performs following processing in steps S803 and S804. The scheduling unit 104 determines the transmission order of the plurality of pieces of data to transmit the data according to the priority set in step S801. In addition, the scheduling unit 104 determines the transmission order of the plurality of pieces of data having the same priority so that the data displayed at the same position in the successive frames is not transmitted in the same order.

Then, in step S805 (transmission procedure), the packet generating unit 105 generates packets based on the generated transmission order information, and the packet transmitting unit 106 transmits the generated packets to the transmission path 108. More specifically, the packet transmitting unit 106 transmits the moving image data to the transmission path 108 according to the transmission order determined by the scheduling unit 104 in step S805.

As described above, in the present exemplary embodiment, in a case of transmitting the moving image data which includes the frames each divided into the plurality of pieces of data (slices), the transmission order of each unit of division (slice) is determined to transmit the data according to the priority set for each unit of division. Further, the transmission order of the unit of division having the same priority is determined so as not to transmit the data displayed at the same position in the successive frames in the same transmission order.

Accordingly, the packet loss that largely influences the other packets can be reduced. Further, errors due to the packet loss can be distributed.

Next, a second exemplary embodiment in which a transmission order is determined by combining a priority and packet transmission timing control is described.

Figure 4:
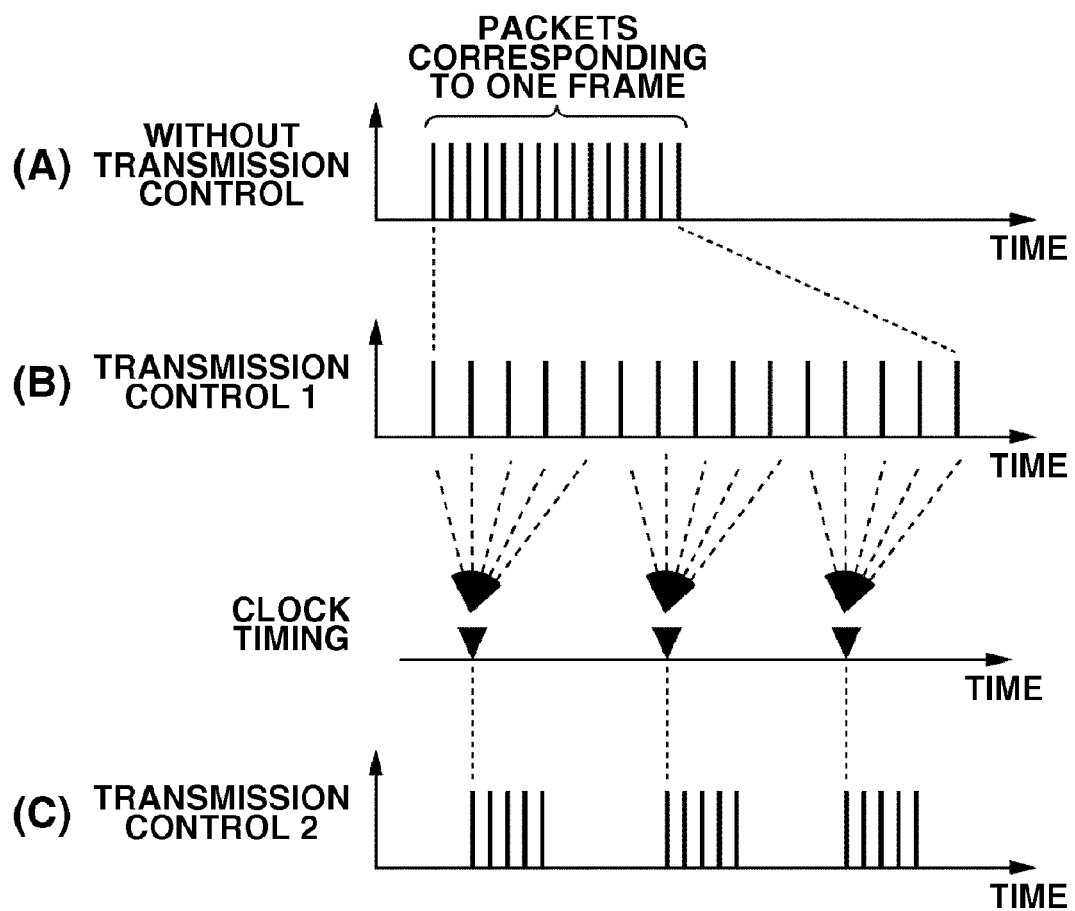
FIG. 4 illustrates an example of how to control packet transmission timing.

FIG. 4 illustrates several patterns of a method for controlling packet transmission timing.

In FIG. 4, (A) "without transmission control" illustrates packet transmission intervals when packets corresponding to one frame is successively transmitted to a network without particular control of transmission timing.

In FIG. 4, (B) "transmission control 1" illustrates a control method that equally widens packet transmission intervals by utilizing time when no packet is transmitted to reduce a data loss due to an overflow of a buffer in a router on a network path.

In FIG. 4, (C) "transmission control 2" illustrates a control method that transmits a plurality of packets at a burst at one clock timing to average packet transmission intervals.

When priority information and the transmission control methods illustrated in (a) to (c) in FIG. 4 are combined, the method described in the first exemplary embodiment is suitable for the examples (A) "without transmission control" and (B) "transmission control 1". That is because by the method slices are transmitted in the descending order of priority, and the transmission order of data having the same priority is determined not to transmit the data displayed at the same position in the successive frames in the same transmission order.

A method in which the priority and the transmission control method (C) "transmission control 2" are combined is described below.

In FIG. 5, one frame (picture) 500 includes a slice 1 to a slice 15. Further, each of a block 1 (502), a block 2 (503), and a block 3 (504) corresponds to data transmitted at one clock timing. At this time, an interval between slices in the same block (for example, slices 10 and 6) is shorter than an interval between slices in different blocks (for example, slices 7 and 5).

Furthermore, a number of priority levels 501 in FIG. 5 depends on a number of slices in each block. More specifically, a number of slices to be transmitted at each clock timing is determined based on clock timing, a bit rate or a frame rate of moving image data, a number of packets per frame, and a number of slices in one frame as a basis of the transmission control. Then, the number of priority levels is determined based on the determined number of slices to be transmitted at each clock timing to determine the priority.

In the present exemplary embodiment, as illustrated in FIG. 5, five slices are transmitted at one clock timing. The priority is set at five levels. Further, the priority 501 in FIG. 5 indicates that the priority is set for each slice at five levels A to E. In the present exemplary embodiment, a highest priority level is defined as A, and the priority levels are set like A>B>C>D>E in descending order.

In the present exemplary embodiment, the transmission order is determined so as to transmit the data of each slice in the descending order of priority from the first slice in each block.

More specifically, first, the transmission order is determined so that the slices 5, 10, and 15 which are set to the priority level A come first in the respective blocks (502, 503, and 504). Then, the transmission order is determined so that the slices 3, 6, and 8 which are set to the priority level B come second in the respective blocks. As for the other slices, the transmission order is similarly determined so that a slice which is set to a higher priority level comes closer to a first position in each block. As in the first exemplary embodiment, the transmission orders of the plurality of the slices having the same priority are determined randomly, for example, to transmit the slices in the order different from the rasterization order.

Figure 9:
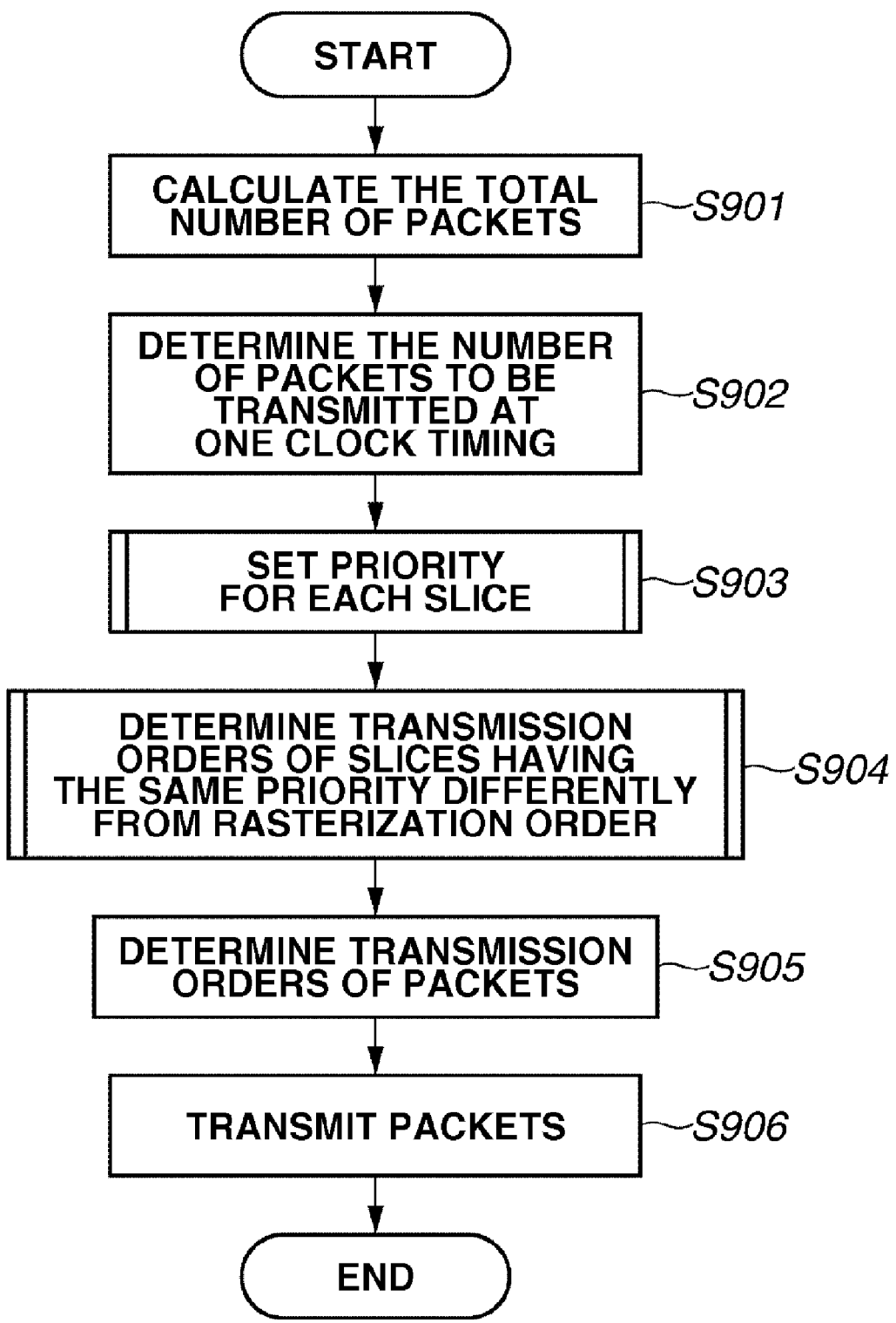
FIG. 9 is a flowchart illustrating processing of a method for transmitting moving image data when a priority and transmission timing control are combined.

Next, a processing flow for determining the priority and the transmission order in FIG. 5 is described with reference to FIG. 9. The processing of the second exemplary embodiment is performed using the moving image data transmission apparatus as illustrated in FIG. 1.

First, in step S901, the characteristic extracting unit 102 calculates the number of packets and the number of slices per frame in transmitting one frame, based on information about a frame size or a size of the slice constituting the frame. In addition, the characteristic extracting unit 102 generates the characteristic information 109 in step S901.

In step S902, the characteristic extracting unit 102 determines the number of slices to be transmitted at each clock timing and block transmission intervals (integral multiple of clock timing) based on the information obtained in step S901.

Further, the characteristic extracting unit 102 determines the number of priority levels based on the determined number of slices to be transmitted at each clock timing. In the present exemplary embodiment, the number of priority levels is set equal to the number of slices in one block.

In step S903 (setting procedure), the priority setting unit 103 sets the priority for each slice based on the number of priority levels determined in step S902 and the characteristic information 109 generated by the characteristic extracting unit 102, and the processing advances to step S904. In other words, the priority setting unit 103 sets the priority for each data obtained by dividing one frame into a plurality of portions.

In step S904, the scheduling unit 104 determines the transmission order of the plurality of slices having the same priority to transmit the slices in the order different from the rasterization order. In the present exemplary embodiment, in step S904, the scheduling unit 104 determines in which block each of the slices having the same priority is transmitted.

For example, in FIG. 5, if the transmission order is determined following the rasterization order, slices (5, 10, and 15) which are set to the priority level A are transmitted in the following order, the slice 5 (block 1), the slice 10 (block 2), and the slice 15 (block 3). However, in the present exemplary embodiment, the transmission order is different from the rasterization order, namely the slice 10 (block 1), the slice 5 (block 2), and the slice 15 (block 3).

Then, in step S905 (determination procedure), the scheduling unit 104 determines the transmission orders of all slices based on the set priority and the transmission orders determined in step S904.

Further, in step S905, the scheduling unit 104 determines the transmission order and transmission timing of packets which are obtained by packetizing the slices based on information about the transmission order of the slices and the packet transmission timing to generate transmission order information.

Then, the scheduling unit 104 sends the generated transmission order information and encoded data to the packet generating unit 105. In other words, the scheduling unit 104 performs the following processing in steps S904 and S905. The scheduling unit 104 determines the transmission orders of the plurality of pieces of data to transmit the data according to the priority set in step S903. In addition, the scheduling unit 104 determines the transmission orders of the plurality of pieces of data having the same priority not to transmit the data displayed at the same position in the successive frames in the same transmission order.

In step S906 (transmission procedure), the packet generating unit 105 generates packets based on the transmission order information and the encoded data, and the packet transmitting unit 106 transmits the packets to the transmission path 108. More specifically, the packet transmitting unit 106 transmits the plurality of blocks to the transmission path 108 at some intervals according to the transmission orders determined by the scheduling unit 104 in step S906.

In the present exemplary embodiment, the characteristic extracting unit 102 determines the number of priority levels and then, the priority setting unit 103 sets the priority. However, the present invention is not limited to the above described method. In other words, the priority may be set without limiting the number of levels in advance. The priorities can be adjusted based on the number of levels which are determined after setting the priority.

Next, another example in which the priority and the transmission order are determined in a manner different from that in FIG. 5 is described with reference to FIG. 6.

In FIG. 6, one frame (picture) 600 includes 15 slices similar to that in FIG. 5, but a priority 601 of each slice is set without limiting the number of levels. Similarly, each of a block 1 (602), a block 2 (603), and a block 3 (604) corresponds to data transmitted at one clock timing.

At this time, the transmission order of slices are determined to transmit the slices in the descending order of priority from the first slice of each block as indicated by a priority level 605.

More specifically, the first slice in a first block is a slice (slice 10) having the top priority in the frame, and a slice (slice 5) having the second priority is the first slice in a second block. After the first slices of all blocks are determined in a similar way, a slice (slice 6) having the next highest priority comes second in the first block. Accordingly, the transmission order is determined according to the priority as indicated by the priority level 605.

In the present exemplary embodiment, the unit of slice, which constitutes the frame is, in a case of the MPEG-2 or MPEG-4 system, a video packet divided by the resynchronization marker as in the first exemplary embodiment.

Further, as in the first exemplary embodiment, the priority and the transmission order information are set on a slice or video packet basis regardless of whether the slice or video packet is divided in performing packetization in the present exemplary embodiment.

Figure 7:
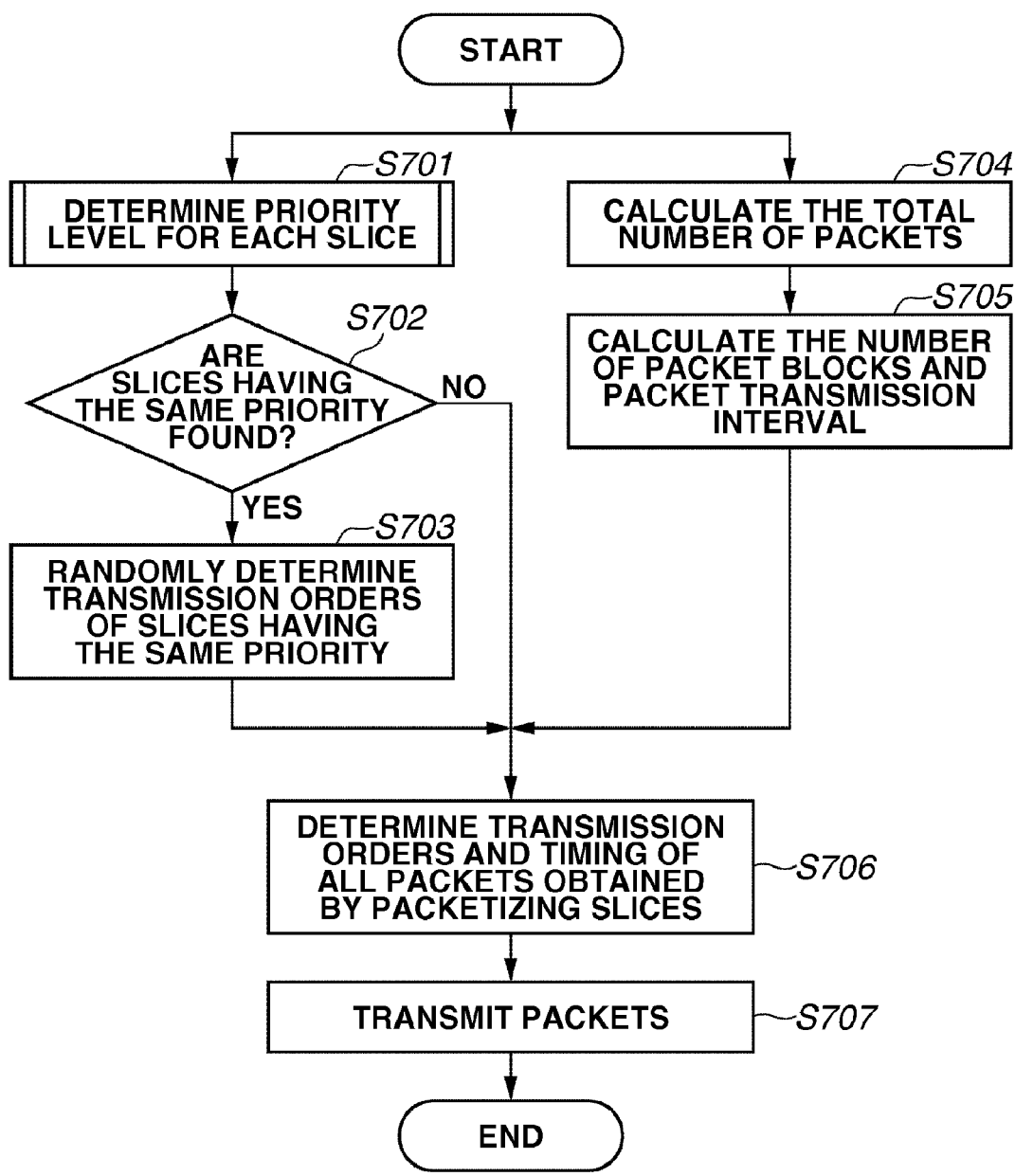
FIG. 7 is a flowchart illustrating processing of a method for transmitting moving image data when priorities are set without limitation.

Next, the processing flow for determining the priority and the transmission order as illustrated in FIG. 6 is described with reference to FIG. 7.

First, in step S701 (setting procedure), the priority setting unit 103 sets the priority for each slice based on division size information and the configuration information about encoded data which are generated by the characteristic extracting unit 102. As in the first exemplary embodiment, the priority is set based on the number of intra macroblocks per slice. The priority may be set based on a percentage of the intra macroblocks and an average size of the macroblocks.

More specifically, the priority setting unit 103 sets the priority for each of the plurality of pieces of data obtained by dividing each frame constituting the moving image data in step S701. At this time, the priority is set based on characteristics of each of the plurality of pieces of data.

In step S702, the scheduling unit 104 determines whether the plurality of slices are given the same priority, based on the priority set in step S701. If the slices having the same priority are found (YES in step S702), the processing advances to step S703. If the slices having the same priority are not found (NO in step S702), the processing advances to step S706.

In step S703, the scheduling unit 104 randomly determines the transmission order, for example, to transmit the slices having the same priority in the order different from the rasterization order. If the slices having the same priority are not transmitted in the rasterization order, the transmission order may be determined not randomly but in any other manner.

On the other hand, in step S704, the characteristic extracting unit 102 calculates the number of packets and the number of slices per frame in transmitting one frame based on information about the frame size or the size of the slice constituting the frame in parallel with an operation of setting priority for each slice. Then, in step S705, the characteristic extracting unit 102 determines the number of slices to be transmitted at each clock timing and block transmission intervals (integral multiple of clock timing) based on the information obtained in step S704.

In step S706 (determination procedure), the scheduling unit 104 determines the transmission order and transmission timing of packets which are obtained by packetizing the slices based on the information about the transmission order of the slices and the packet transmission timing to generate the transmission order information.

Then, the scheduling unit 104 sends the transmission order information and encoded data to the packet generating unit 105. More specifically, the scheduling unit 104 performs the following processing in steps S703 and S706. The scheduling unit 104 determines the transmission orders of the plurality of pieces of data to transmit the data according to the priority set in step S701. In addition, the scheduling unit 104 determines the transmission orders of the plurality of pieces of data having the same priority not to transmit data displayed at the same position in the successive frames in the same transmission order.

Then, in step S707 (transmission procedure), the packet generating unit 105 generates packets based on the transmission orders determined in step S706, and the packet transmitting unit 106 transmits the generated packets to the transmission path 108. More specifically, the packet transmitting unit 106 transmits the plurality of blocks to the transmission path 108 at some intervals based on the transmission orders determined by the scheduling unit 104.

In the present exemplary embodiment, one block can include a plurality of pieces of frame data. In addition, if the plurality of pieces of data in the block include data corresponding to the first position of the frame, the scheduling unit 104 executes the following processing in step S706. The transmission order of the data corresponding to the first position of the frame is replaced with the transmission order of the data not corresponding to the first position of the frame so that the data corresponding to the first position of the frame is located in the first position of the block.

More specifically, if one block includes the plurality of pieces of frame data and at least one of the plurality of pieces of data in one block corresponds to the first position of the frame, data positions are replaced as follows. The transmission order of the data corresponding to the first position of the frame is replaced with the transmission order of the data not corresponding to the first position of the frame so that the data corresponding to the first position of the frame comes in a predetermined transmission order of the block.

In the exemplary embodiments of the present invention, the priorities are set by comparing the number of intra macroblocks, the percentage of intra macroblocks, and the average size of macroblocks every unit of division of each frame, but the present invention is not limited thereto.

For example, a relationship between the number of intra macroblocks in the unit of division and a corresponding priority may be preset, and the priority setting unit 103 may set the priority based on the number of intra macroblocks and the preset priority information or combination thereof.

Further, in the exemplary embodiments of the present invention, the priority and the transmission order is determined on a slice (video packet) basis, but the present invention is not limited thereto. More specifically, for example, the priorities and the transmission orders may be determined on the basis of a plurality of slices (video packets).

In the exemplary embodiments of the present invention, if the encoding system is MPEG-4 and no resynchronization marker is included, the scheduling unit 104 replaces divided data including the first slice with divided data which corresponds to other than the first position of the frame so that the divided data including the first slice is located at a predetermined position in the block.

Further, in the exemplary embodiments of the present invention, the divided data including the first slice is replaced with the divided data which corresponds to other than the first position of the frame so that the divided data including the first slice comes to a first position in the block. As a result, a possibility of losing the VOP header including information necessary for decoding a frame can be reduced.

The present invention can be implemented by following configurations. A storage medium storing a program code of software that realizes functions of the above exemplary embodiments is supplied to a system or an apparatus. Then, a computer (a central processing unit (CPU) or a microprocessor unit (MPU)) of the system or apparatus reads and executes the program code stored in the storage medium.

In this case, the program code read from the storage medium implements the functions of the above exemplary embodiments, and the storage medium storing the program code embodies the present invention.

Examples of the storage medium for supplying the program code include a floppy disk, a hard disk, an optical disk, a magneto-optical disk, a compact disk-read only memory (CD-ROM), a CD-recordable (CD-R), a magnetic tape, a nonvolatile memory card, a read only memory (ROM), and a digital versatile disk (DVD).

The present invention is not limited to a configuration in which a computer reads and executes a program code to realize the functions of the above exemplary embodiments. In other words, the functions of the above exemplary embodiments of the present invention can be also accomplished by processing in which an operating system (OS) running on a computer executes a part or all of actual processing based on an instruction of the program code.

Furthermore, the present invention also encompasses a configuration in which the program code read from the storage medium is written to a memory in a function extension board inserted into a computer or a function extension unit connected to the computer, and a CPU provided in the function extension board or the function extension unit performs a part or all of actual processing according to an instruction of the program to realize the functions of the above exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-280442 filed Oct. 29, 2007, which is hereby incorporated by reference herein in its entirety.

What is claimed is:

1. A method for transmitting moving image data that includes a plurality of frames, wherein each frame is divided into a plurality of pieces of data, the method comprising:
    setting a priority to each piece of data in the plurality of pieces of data based on a characteristic thereof;
    grouping the plurality of pieces of data into a plurality of blocks, each of which includes some of the plurality of pieces of data;
    determining a transmission order of the plurality of pieces of data to transmit the plurality of pieces of data according to the set priority, wherein a transmission order of first data and second data having a same priority and included in a first frame is determined such that, the first data is transmitted in a different transmission order from that of third data displayed at a same position in a second frame as first data in the second frame, and the first frame, including the first data, and the second frame are transmitted successively; and
    transmitting the plurality of pieces of data in the determined transmission order at predetermined intervals in which intervals between the plurality of pieces of data in a block are shorter than an interval between different blocks.

2. The method according to claim 1, further comprising:
    determining a transmission order of the pieces of data in each block based on the set priority.

3. The method according to claim 1, wherein the data includes a macroblock that includes a predetermined number of pixel data, the method further comprising:
    setting the priority based on whether the macroblock is encoded using data in another frame.

4. The method according to claim 1, further comprising:
    setting the priority based on a data size of respective plurality of pieces of data.

5. The method according to claim 1, further comprising:
    determining a transmission order so that, in response to synchronization information indicating a reproduction position of data not being included in any position other than a first position of each frame constituting the moving image data, data corresponding to the first position of each frame from among the plurality of pieces of data is transmitted in a predetermined order.

6. The method according to claim 1, further comprising:
    determining, in response to one piece of data of the plurality of pieces of data corresponding to a first position of the frame, a transmission order of the plurality of pieces of data in order to transmit the one piece of data at a predetermined transmission order in a block.

7. The method according to claim 6, further comprising:
    determining the transmission order so that the data corresponding to the first position of each frame is located on a first position of a block.

8. A communication apparatus which transmits moving image data that includes a plurality of frames, wherein each frame is divided into a plurality of pieces of data, the communication apparatus comprising:
    a setting unit configured to set a priority to each piece of data in the plurality of pieces of data based on a characteristic thereof;
    a grouping unit configured to group the plurality of pieces of data into a plurality of blocks, each of which includes some of plurality of pieces of data;
    a determination unit configured to determine a transmission order of the plurality of pieces of data to transmit the plurality of pieces of data according to the set priority, wherein a transmission order of first data and second data having a same priority and included in a first frame is determined such that, the first data is transmitted in a different transmission order from that of third data displayed at a same position in a second frame as first data in the second frame, and the first frame, including the first data, and the second frame are transmitted successively; and
    a transmission unit configured to transmit the plurality of pieces of data in the determined transmission order at predetermined intervals in which intervals between the plurality of pieces of data in a block are shorter than an interval between different blocks.

9. The communication apparatus according to claim 8, further comprising:
    a determination unit configured to determine a transmission order of the pieces of data in each block based on the set priority.

10. The communication apparatus according to claim 8, further comprising:
    a determining unit configured to determine, in response to one piece of data of the plurality of pieces of data corresponding to a first position of the frame, a transmission order of the plurality of pieces of data in order to transmit the one piece of data at a predetermined transmission order in a block.

11. The communication apparatus according to claim 10, further comprising:
a determining unit configured to determine the transmission order so that data corresponding to the first position of each frame is located on a first position of a block.

12. A non-transitory computer readable medium containing computer-executable instructions for transmitting moving image data that includes a plurality of frames, wherein each frame is divided into a plurality of pieces of data, the non-transitory computer readable medium comprising:
computer-executable instructions for setting a priority to each piece of data in the plurality of pieces of data;
computer-executable instructions for grouping the plurality of pieces of data into a plurality of blocks, each of which includes some of the plurality of pieces of data;
computer-executable instructions for determining a transmission order of first data and second data having a same priority and included in a first frame is determined such that, the first data is transmitted in a different transmission order from that of third data displayed at a same position in a second frame as first data in the second frame, and the second frame is transmitted successive to the first frame having the first data; and
computer-executable instructions for transmitting the plurality of pieces of data in the determined transmission order at predetermined intervals in which intervals between the plurality of pieces of data in a block are shorter than an interval between different blocks.

13. The non-transitory computer readable medium according to claim 12, further comprising:
computer-executable instructions for determining a transmission order of the pieces of data in each block based on the set priority.

14. The non-transitory computer readable medium according to claim 12, further comprising:
computer-executable instructions for determining, in response to one piece of data of the plurality of pieces of data corresponding to a first position of the frame, a transmission order of the plurality of pieces of data in order to transmit the one piece of data at a predetermined transmission order in a block.

15. The non-transitory computer readable medium according to claim 14, further comprising:
computer-executable instructions for determining the transmission order so that data corresponding to the first position of each frame is located on a first position of a block.

* * * * *